United States Patent [19]

Chung et al.

[11] Patent Number: 4,549,262

[45] Date of Patent: Oct. 22, 1985

[54] CHIP TOPOGRAPHY FOR A MOS DISK MEMORY CONTROLLER CIRCUIT

[75] Inventors: Randall M. Chung, Laguna Niguel; Larry D. Rossean, Westminster, both of Calif.

[73] Assignee: Western Digital Corporation, Irvine, Calif.

[21] Appl. No.: 505,754

[22] Filed: Jun. 20, 1983

[51] Int. Cl.[4] .................... G06F 3/00; G06F 13/00; H01L 27/06
[52] U.S. Cl. .................................... 364/200; 357/45
[58] Field of Search ... 364/200 MS File, 900 MS File; 357/45

[56] References Cited

U.S. PATENT DOCUMENTS

| | | | |
|---|---|---|---|
| 3,808,475 | 4/1974 | Buelow et al. | 357/45 |
| 4,144,561 | 3/1979 | Tu et al. | 357/45 X |
| 4,204,250 | 5/1980 | Getson et al. | 364/200 |
| 4,393,464 | 7/1983 | Knapp et al. | 357/45 X |
| 4,433,378 | 2/1984 | Leger | 364/200 |
| 4,449,202 | 5/1984 | Knapp et al. | 357/45 X |

*Primary Examiner*—James D. Thomas
*Attorney, Agent, or Firm*—Spensley Horn Jubas & Lubitz

[57] ABSTRACT

An improved chip topography for a disk memory controller circuit is provided which includes electrical interface circuitry disposed around the periphery of the chip and forming an approximately quadrilateral framework surrounding the remainder of the circuitry, a read-only-memory (ROM) disposed in one corner of the interface framework; a microcontroller disposed adjacent to the ROM and along part of a first side of the interface framework; read data processing circuitry disposed adjacent to the microcontroller and within a second corner of the interface framework and along part of a second side thereof; error checking circuitry disposed adjacent to the read data processing circuitry and along part of the second side of the interface framework; the microcontroller also being disposed adjacent to the error checking circuitry and along part of the second side of the interface framework; write data processing circuitry disposed adjacent to the microcontroller along the second side of the interface boundary, within a third corner of the interface framework and along a part of a third side of the interface boundary; the microcontroller also being disposed adjacent to the write data processing circuitry and along the third side of the interface framework; input/output (I/O) buffer/latch circuitry disposed adjacent to the micro controller along the third side of the interface framework, which is also disposed within the fourth corner and along a part of a fourth side of the interface framework, the microcontroller also being disposed adjacent to and between the I/O buffer/latch circuitry and the ROM along the fourth side of the interface framework; and task registers disposed between the microcontroller and the I/O buffer/latch circuitry.

16 Claims, 11 Drawing Figures

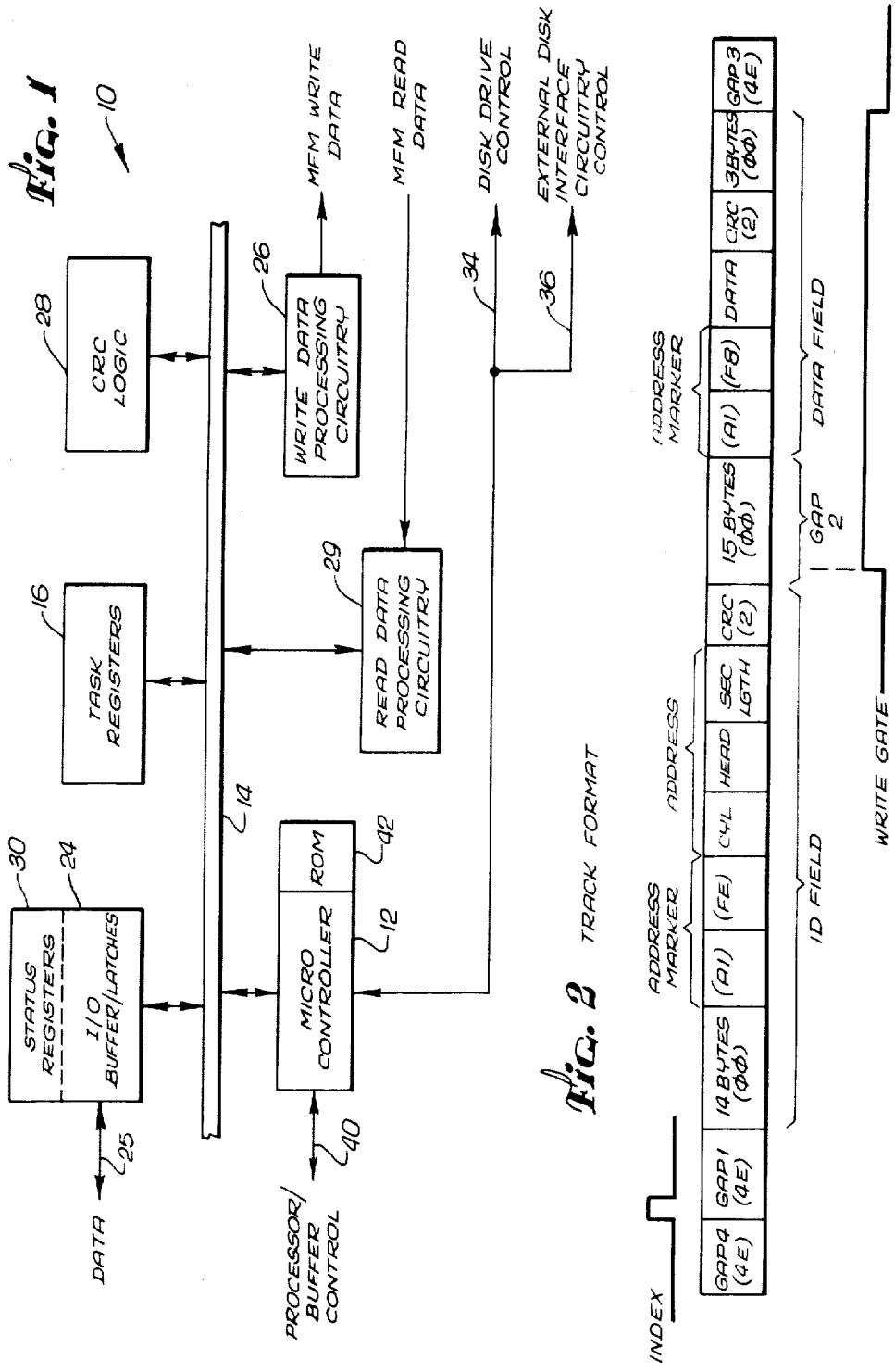

CHIP TOPOGRAPHY FOR A MOS DISK MEMORY CONTROLLER CIRCUIT

BACKGROUND OF THE INVENTION

The present invention is directed to disk memory controller circuits and more particularly, to the topographical layout of disk memory controller circuits which are integrated on semiconductor chips.

A disk memory is a large capacity memory in which digital data is stored on one or more rotating disks. Each disk is usually coated with a ferro-magnetic material. Data is written on the disk by passing a current through a coil in a read/write head positioned adjacent the disk. The current through the coil magnetizes a small area on the disk. The size of the magnetized area generally depends upon the speed of rotation of the disk and the duration of the writing current. To read the data stored on a disk, the coil of the read/write head is used as a sense winding. The movement of a magnetized area under the head induces a voltage in the coil which is sensed by a sense amplifier.

A disk memory controller circuit is provided to control the motion of the head in order to read or write data at a particular location on the disk. In addition, the data to be written on or read from the disk is typically transmitted through the disk controller circuit.

Data to be stored in a disk memory is often stored first in a buffer memory by the central processing unit (CPU) of the computer system. The data is then read from the buffer memory by the disk memory controller circuit and written onto the disk at the disk memory location specified by the CPU. Conversely, in read operations, data read from the disk memory at a location specified by the CPU is transferred by the disk memory controller circuit to the buffer memory.

However, merely designing a circuit to perform these functions is not sufficient to insure that such a circuit will be economical to manufacture as a metal oxide semiconductor (MOS) large scale integrated (LSI) circuit chip. The primary consideration in the economical manufacture of MOS LSI circuits is minimizing the amount of substrate material (such as silicon) required to produce an integrated circuit chip, thus allowing a greater chip yield per substrate wafer.

The surface geometry of the MOS circuitry is formed on a chip and the interconnection pattern of conductors therebetween must be optimized to provide the highest functional component density in order to reduce overall chip area per circuit function. Minimum geometry spacings between metallization lines, diffused regions, and polycrystalline silicon conductors must be maintained, yet the length of such lines and their associated capacitances must be minimized in order to optimize circuit performance as the complex interconnection patterns are implemented. Parasitic electrical effects on the circuitry also must be minimized or compensated for in the chip layout. A very high degree of creativeness is thus required of the chip architect in order to choose a particular layout and interconnection pattern for an LSI circuit from the very large number of possibilities that exist for arranging such a circuit. Frequently, the commercial success of a MOS LSI product may hinge on the ability of a chip architect to achieve an optimum chip topography.

By creatively structuring the topographic layout of the DMC chip, the present invention allows a MOS LSI chip size of 238.2 mils by 245.2 mils, with a processing speed of up to 5 megabits per second, or even more. The preferred embodiment of the present invention is fabricated in N-channel, self-aligned silicon gate MOS technology, and is transistor-transistor logic (TTL) compatible on all inputs and outputs.

It is therefore an object of this invention to provide an optimum chip topography for a MOS LSI disk memory controller circuit.

SUMMARY OF THE INVENTION

The topography design of the present invention minimizes the amount of substrate material required for each integrated circuit chip by optimizing the size-limiting parameters common to MOS processing technology. The disc memory controller (hereinafter often referred to as the "DMC") chip topography developed includes electrical interface circuitry disposed around the periphery of the chip and forming an approximately quadrilateral framework surrounding the remainder of the circuitry, a read-only-memory (ROM) disposed in one corner of the interface framework; a microcontroller disposed adjacent to the ROM and along part of a first side of the interface framework; read data processing circuitry disposed adjacent to the microcontroller and within a second corner of the interface framework and along part of a second side thereof; error checking circuitry disposed adjacent to the read data processing circuitry and along part of the second side of the interface framework; the microcontroller also being disposed adjacent to the error checking circuitry and along part of the second side of the interface framework; write data processing circuitry disposed adjacent to the microcontroller along the second side of the interface boundary, within a third corner of the interface framework and along a part of a third side of the interface boundary; the microcontroller also being disposed adjacent to the write data processing circuitry and along the third side of the interface framework; input/output (I/O) buffer/latch circuitry disposed adjacent to the micro controller along the third side of the interface framework, which is also disposed within the fourth corner and along a part of a fourth side of the interface framework, the microcontroller also being disposed adjacent to and between the I/O buffer/latch circuitry and the ROM along the fourth side of the interface framework; and task registers disposed between the microcontroller and the I/O buffer/latch circuitry.

In another aspect of the present invention, the microcontroller has several subcircuits for implementing the functions of the microcontroller. The topography design of the microcontroller for the DMC chip includes task register address decoding circuitry disposed adjacent the task registers and along part of the fourth side of the interface framework; program counter and stack circuitry disposed adjacent to the ROM and along a part of the fourth side of the interface framework; ROM address decode circuitry disposed adjacent to the ROM and along a part of the first side of the interface framework; processor interface and buffer control logic disposed adjacent to the read data processing circuitry and along a part of the first side of the interface framework; a first programmed logic array disposed between the read data processing circuitry and the error checking circuitry; a multiphase clock generator disposed adjacent to the write data processing circuitry and along a part of the second side of the interface framework; a second programmed logic array disposed adjacent to the multiphase clock generator and along a part of the second side of the interface framework; step timing circuitry disposed adjacent to the multiphase clock generator and the second programmed logic array; a retry counter disposed adjacent to the multiphase clock generator and the step timing counter; a read bus control circuit disposed adjacent to the retry counter, step timing counter, the second programmed logic array, the error checking circuitry, the first programmed logic array and the read data processing circuitry; a magnitude comparator circuit disposed adjacent to and between the read bus control circuitry and the error checking circuitry and is further disposed along a part of the second side of the interface framework; a third programmed logic array disposed along a part of the third side of the interface framework and adjacent to the write data processing circuitry, the multiphase clock generator, the retry counter and the read bus control circuitry; a condition multiplexor circuit disposed along a part of the third side of the interface framework and is further disposed between and adjacent to the third programmed logic array and the I/O buffer/latch circuitry.

BRIEF DESCRIPTION OF THE DRAWINGS

FIG. 1 is a block diagram of a disk memory controller circuit (DMC) in accordance with the present invention;

FIG. 2 is a diagram illustrating the format in which data is stored on a disk controlled by the DMC of FIG. 1;

Like numbers in different figures refer to like elements.

DETAILED DESCRIPTION OF THE DRAWINGS

Figure 3:
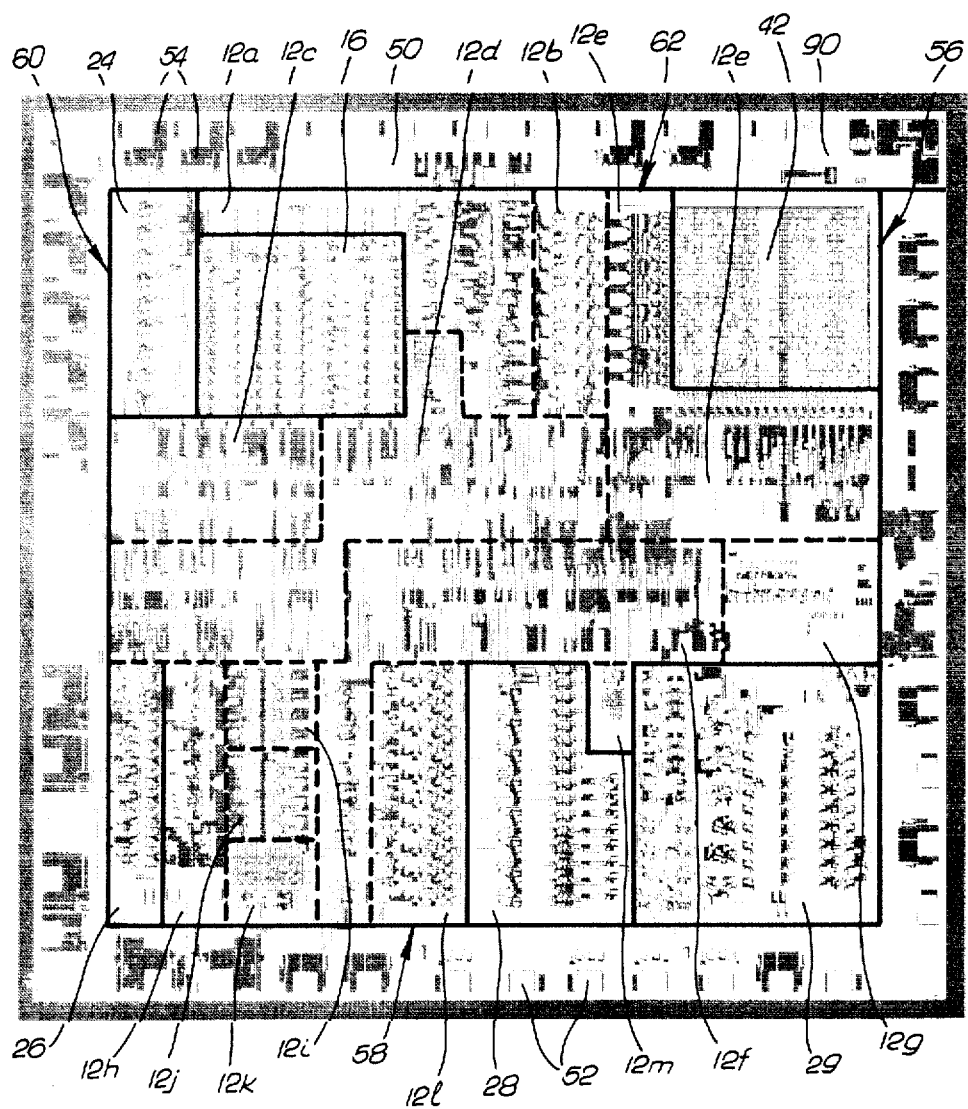
FIG. 3 is a block diagram illustrating the general location on a semi-conductor chip of a DMC circuit according to the present invention.

Referring now to FIG. 1, there is shown a block diagram of a DMC circuit 10 in accordance with a preferred embodiment of the present invention. The DMC circuit 10 has a number of subcircuits including a microcontroller 12 which provides overall control of the DMC circuitry. Many of the functions of the microcontroller 12 are implemented in conjunction with a ROM (read only memory) 42 which contains instructions for directing the microcontroller. Connections between the subcircuits are made by means of busses comprising separate conductors which are indicated generally at 14. Because of the great number of conductors required to implement the control functions, particular care must be taken in laying out the MOS LSI circuitry comprising the present invention.

The subcircuits of the DMC circuit 10 further include a set of registers indicated at 16, which are referred to as "task registers". Among the task registers is a command register in which the system or "host" CPU may write a command to be carried out by the microcontroller 12. In the illustrated embodiment, these commands include (1) restore; (2) read sector; (3) write sector; (4) scan ID; (5) write format; and (6) seek.

To execute the restore command, the DMC chip 10 causes the read/write head of the disk memory to move back to the starting track designated "track 0". Each "track" is a concentric circular path traced out by the read/write head over the disk as the disk rotates beneath the read/write. A disk can typically have a 1000 or more such tracks.

A disk memory unit (also referred to as a disk drive) can have several co-axial disks and associated read/write heads. The read/write heads of a disk drive are typically moved in unison such that the circular tracks being read by the read/write heads at any one particular time are aligned with respect to each other and define a cylinder. Thus, each such set of tracks is referred to as a "cylinder".

A read sector command causes the DMC chip to read one or more "sectors" (a portion of a cylinder) of data starting at a specified cylinder and sector. The task registers 16 have a cylinder register and a sector register for storing the beginning cylinder and sector addresses. These addresses are stored in the cylinder and sector registers by the host CPU before the sector command is written into the command register. When a "write sector" command is written into the command register, the DMC chip writes the data previously stored in a buffer memory 20 (FIG. 4) by the CPU into the disk drive indicated at 18 in FIG. 4. The data is stored in the disk drive at the locations specified in the cylinder and sector registers of the task registers 16.

In the illustrated embodiment, the disk drive 18 is a Winchester type disk drive. The DMC chip 10 can control four such disk drives.

Referring now to FIG. 2, the data is stored on the disk in a particular format in which an ID field preceeds the actual data. This ID field identifies the location or address at which the data is stored. The ID field includes the cylinder number, sector size, head number and sector number. In response to a "scan ID" command, this ID information is loaded into the respective registers of the task registers 16 to be subsequently addressed and read by the host CPU. The "write format" command formats one or more sectors of data in accordance with the parameters specified by the task registers, and the "seek" command moves the head to a specified track.

Besides the command register and the registers which specify the cylinder number, sector number, sector count, sector size, drive number (if more than one disk drive is in the system), and head number, the task registers 16 also include a "write precompensation cylinder" register and an error flag register. The error flag register has several bits which may be set to indicate various error conditions. The write precompensation cylinder register may contain any value from 0 to 255 in the illustrated embodiment, which specifies the particular cylinder at which "write precompensation" commences.

Figure 4:
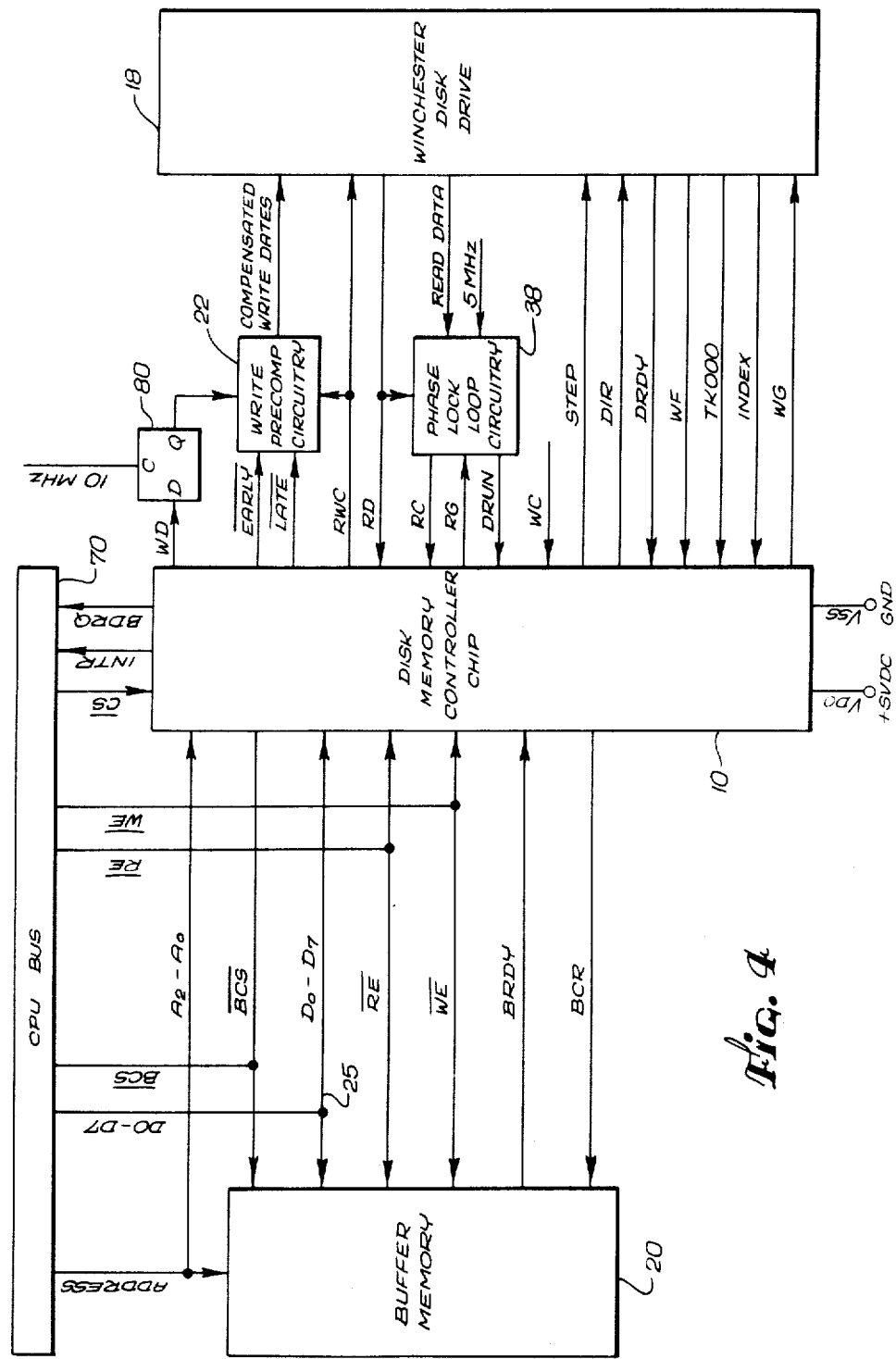
FIG. 4 is a block diagram illustrating the DMC of FIG. 1 connected in a computer system having one or more disk drives.

Write precompensation is a technique for squeezing data bits closer together before the data is written onto the disk. As previously mentioned, each track on the disk is a concentric circular path. As a result, each track has successively less space for storing data than the preceeding track as the head moves radially inward on the disk. Consequently, the data on each track is stored progressively more densely than the preceeding track. If the data is stored too closely together, a natural repulsion occurs which pushes the data bits apart which can disrupt the data. In order to compensate for this repulsion, the data is intentionally written closer together starting at a particular cylinder defined by the write precompensation register. As a result, the repulsion of the data pushes the data bits apart to the desired spacing. This write precompensation is performed by an external circuit 22 (FIG. 4).

Referring back to FIG. 1, the various registers of the task registers 16 can be individually addressed by the host CPU to read information or write information, as appropriate, into the registers. Both the task register data (and the data transferred between the buffer memory 20 and the disk drive 18) pass through the input-/output (I/O) buffer/latch circuitry 24. The I/O buffer/latches 24 buffer the input data signals to a level compatible with the circuitry of the DMC chip 10 and also latch the data to temporarily store the data before the data is passed onto the buffer memory or the other subcircuits of the chip.

The DMC circuitry 10 also includes write data processing circuitry 26 which converts the data read from the buffer memory 20 into a form suitable for storing on the disk drive 18. The write data processing circuitry 26 receives 8 bits of parallel data and converts it to serial data. This serial data is encoded by modified frequency modulation (MFM) and then transmitted to the disk. MFM is a well known data encoding technique in which data is stored on the disk in a format utilizing data bits, clock bits and data cells. A data cell refers to the space along the track in which a data bit is stored. In the MFM technique, a data bit is stored within the data cell only if the data bit is a logical one. Furthermore, a clock bit marking the data cell boundary is stored only between consecutive logical zeros.

An additional function performed by the write data processing circuitry 26 is to format the data in the format shown in FIG. 2. As seen therein, each data field is preceeded by a gap of 15 bytes of zeros and the ID field. In the illustrated embodiment, the ID field includes 14 bytes of zeros, an address marker, the address at which the information is being stored on the disk and the cyclic redundancy check (CRC) characters. The address marker is a two byte code placed at the beginning of each ID field or data field, which specifies whether the following bytes are an ID field or a data field.

The CRC characters provide a check for the ID fields and data fields to determine whether an error has occurred in the process of storing and retrieving the data. The CRC characters are computed by a CRC logic circuit 28 shown in FIG. 1. These CRC characters are then appended to the ID and data fields before the data is stored on the disk. When the data is subsequently read from the disk, the CRC logic 28 checks the CRC characters to determine if an error has occurred in either the ID or data fields.

Data read from the disk drive 18 is received by the read data processing circuitry 29. The data from the disk has been stored serially in the MFM format as previously described. The read data processing circuitry 29 decodes the incoming serial stream of data and examines it for an address marker. Eight bit binary data is then generated from the MFM data once an address marker has been detected. This eight bit binary data is then transferred by the microcontroller 12 to the buffer memory 20 (FIG. 4).

The DMC circuitry also includes two status registers which are not physically located with the task registers 16 but instead are located with the I/O buffer/latches 24. These registers provide various types of status information such as indicating that the controller is accessing the disk; the drive is ready for a data transfer; a transfer of data to the buffer memory has been requested or the execution of a command is in progress. In addition, these registers provide error information such as the detection of a bad block address mark; the detection by the CRC logic 28 of an error in the data field; a cylinder, head, sector, or size parameter indicated cannot be found; a specified data address mark cannot be found, and so on. The status registers 30 are apart from the task registers 16 to allow these registers to be accessed by the host CPU, while the microcontroller 12 is accessing the task registers 16.

The microcontroller 12 generates several signals which control the operation of the disk drive. Furthermore, the microcontroller 12 receives several signals which indicate status and error information from the disk drive. The control signal lines between the microcontroller 12 and the disk drive 18 are represented generally at 34.

The microcontroller 12 is also coupled to a plurality of control lines 36 on which control signals are transmitted and received between the microcontroller 12 and the external disk interface circuitry such as the write precompensation circuitry 22 previously described. The external disk interface circuitry also includes phase lock loop circuitry 38 (FIG. 4) which is more fully described below. Control signals between the microcontroller 12 and the host CPU and the buffer memory 20 are transmitted over lines represented at 40.

Referring now to FIG. 3, the general location of the DMC circuitry on a semiconductor chip is illustrated. The periphery 50 of the chip is used for the bonding pads 52 which couple the DMC circuitry to the input-/output pins of the external package in conventional fashion. The periphery 50 also includes interface circuitry 54 to insure that the output signals from the DMC chip are electrically compatible with external circuitry, and vice-versa. In the illustrated embodiment of the DMC chip, the interface circuitry 54 enables the n-MOS circuitry of the DMC chip to interface with TTL logic levels.

Located within the approximately quadrilateral framework of the interface circuitry 54 are the following subportions of the DMC circuit: the ROM 42 is disposed within one corner of the interface circuitry 54; the microcontroller 12 (its constituent parts indicated at 12a–12m) is disposed adjacent to the ROM 42 and along part of a first side of the interface circuitry 54 indicated generally at 56; the read data processing circuitry 29 is disposed adjacent to the microcontroller 12 and within a second corner of the interface circuitry; the CRC error checking circuitry 8 is disposed adjacent to the read data processing circuitry 29 and along part of a second side of the interface circuitry indicated at 58; the microcontroller 12 is also disposed adjacent to the CRC circuitry 28 and along part of the second side 58 of the interface circuitry 54; the write data processing circuitry 26 is disposed adjacent to the microcontroller 12 along the second side 58 of the interface circuitry 54, and is disposed within a third corner of the interface circuitry 54 and along a part of a third side of the interface circuitry 54 indicated generally at 60; the microcontroller 12 is also disposed adjacent the write data processing circuitry 26 along the third side 60 of the interface circuitry 54; the I/O buffer/latch circuitry 24 is disposed adjacent to the microcontroller 12 along the third side 60 of the interface circuitry 54, and is disposed within a fourth corner and along a part of a fourth side of the interface circuitry 54 indicated generally at 62; the microcontroller 12 is also disposed between the I/O buffer/latch circuitry 24 and the ROM 42 along the fourth side 62 of the interface circuitry 54; and the task registers 16 are disposed between the micro-controller 12 and the I/O buffer/latch circuitry 24.

Figure 11:
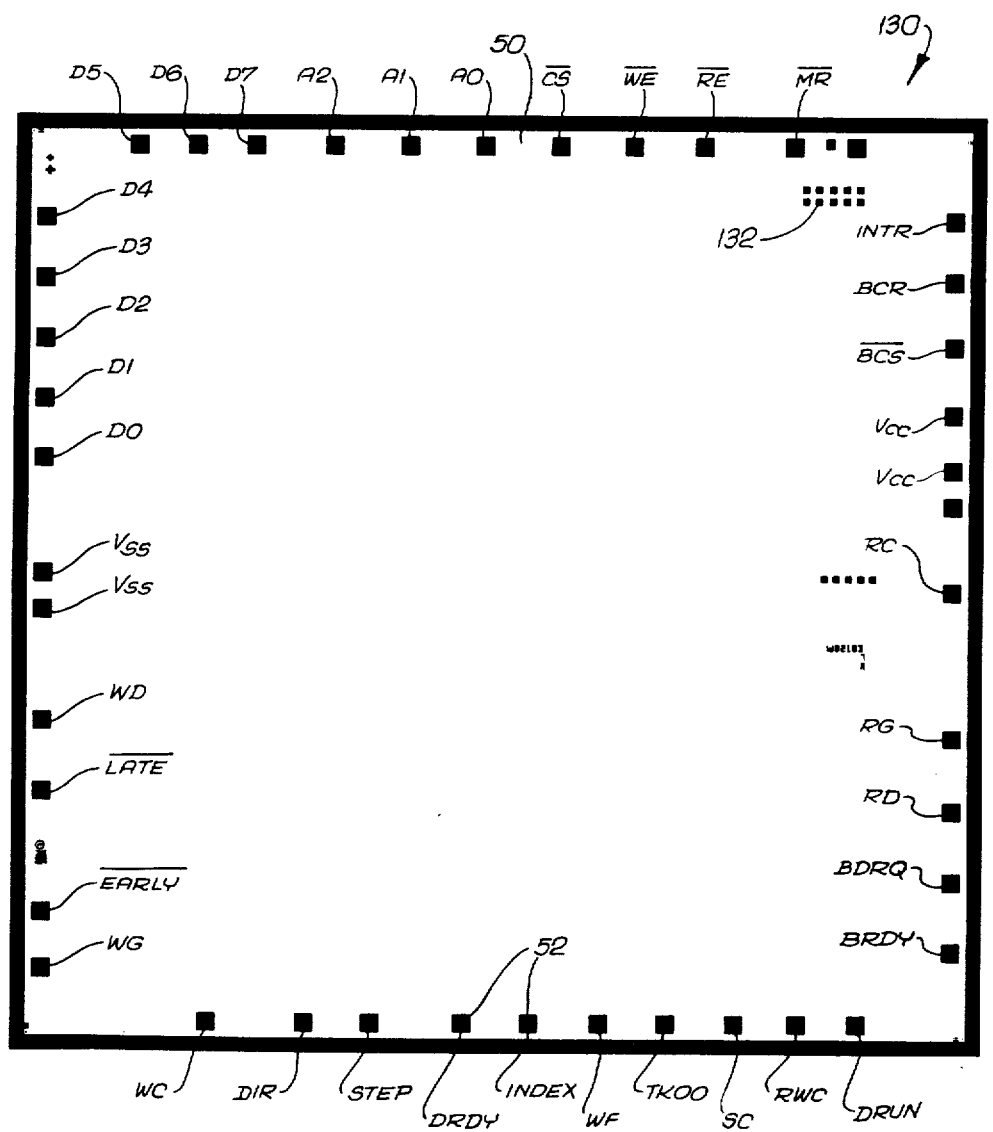
FIG. 11 is a scale drawing of a photomask used to define and isolate the chip bonding pads while the remainder of the chip is protectively coated during the manufacture of a MOS DMC circuit according to the invention.

Referring now to FIG. 11, the bonding pads 52 for the DMC chip 10 are arranged around the periphery 50 of the chip in an order particularly well suited for housing the DMC chip in a 40-pin dual-in-line package within the conventional requirements for bonding lead lengths and angles. In the present embodiment, beginning with the middle left hand side of the chip 10 and proceeding clockwise, the bonding pad and pin order of the DMC chip is set forth in the following table which provides the name and a short description of each pin (and the signal lines associated with each pin):

TABLE

| SYMBOL | NAME | DESCRIPTION |
|---|---|---|
| D7 to D0 | Data Bus | The "data bus" is a tristate bi-directional 8 bit bus. Commands, status, and data to/from buffer memory are transferred over this bus. D7 is most significant bit (MSB). |
| $A_2, A_1, A_0$ | Address Bus | These address inputs are used to select a register from the task register file. $A_2$ is MSB. |
| $\overline{CS}$ | Chip Select | The "chip select" input must be active when reading from or writing into the DMC task register file. |
| $\overline{WE}$ | Write Enable | "Write enable" is a tristate bi-directional line. It is used as input when writing command or task information into the DMC task register file. It is used as an output when writing data from the DMC to buffer memory. |
| $\overline{RE}$ | Read Enable | "Read enable" is a tristate bidirectional line. It is used as input when reading status information from the DMC task register file. It is used as |

TABLE-continued

| SYMBOL | NAME | DESCRIPTION |
|---|---|---|
| | | output when reading data from buffer memory to the DMC. |
| $\overline{MR}$ | Master Reset | "Master reset" input will initialize the the DMC state and clear status flags when activated. |
| INTR | Interrupt Request | "Interrupt request" is an active high output which is set when a command terminates and is reset when the status register is read. |
| BCR | Buffer Counter Reset | The "buffer counter reset" output is used to reset the address counter when the buffer memory is implemented with a counter and static RAM. This output is not used when the buffer memory is implemented with a FIFO memory. |
| $\overline{BCS}$ | Buffer Chip Select | The "buffer chip select" output is active when the DMC is transferring data to or from buffer memory. $\overline{BCS}$ is also used to control bus switching. |
| $V_{cc}$ | | +5 volt |
| RC | Read Clock | The "read clock" input is typically generated from an oscillator phase-locked to the read data. Clock voltages are 0V to 5V. |
| RG | Read Gate | The "read gate" output is inactive until a search is started for an address mark after a sequence of '0's or a sequence of '1's. After an address mark is found, it stays active for data and ID fields and is deactivated for write splice areas. |
| RD | Read Data | The "read data" input is a single ended input which receives MFM read data from the disk drive. Binary data and clock signals are internally separated from the MFM data. |
| BDRQ | Buffer Data Request | The "buffer data request" output is used to initiate direct memory access (DMA) transfers to/from buffer memory. |
| BRDY | Buffer Ready | The "buffer ready" input is used to signal the DMC that the buffer memory is ready for DMC data transfers. It is active when the buffer memory is full or empty. |
| DRUN | Data Run | The "data run" input is the signal which indicates a sequence of '0's or a sequence of '1's. Input signal voltages are 0V to 5V. |
| RWC | Reduced Write Current | The "reduced write current" output indicates to the disk drive that a reduced write current is to be used. RWC is also used to gate write precompensation circuitry. The track where RWC becomes active is programmable. |
| SC | Seek Complete | When the "seek complete" input is active, read or write operations are allowed. |
| TK000 | Track 0 | The "track 0" input is used to verify proper cylinder location when executing a restore command. |
| WF | Write Fault | Receipt of the "write fault" input will halt all read, write, and stepping commands. |
| INDEX | Index Pulse | The "index pulse"0 input is used for timing when formatting. Commands will be aborted if SC is not active for 8 index pulse times. |

TABLE-continued

| SYMBOL | NAME | DESCRIPTION |
|---|---|---|
| DRDY | Drive Ready | Receipt of a deactivated "drive ready" input will halt all read, write and stepping commands. |
| STEP | Step Pulse | "Step pulse" is an output signal which steps the read/write heads. |
| DIR | Direction | The step "direction" output equals "1" when the head stepping direction is inward (i.e., cylinder number increasing). |
| WC | Write Clock | The "write clock" frequency = 5 MHZ for ST500, 4.34 MHZ for SA1000. Clock voltages will be 0V to 5V. |
| WG | Write Gate | The "write gate" output is active when write data is valid, which enables the head write current. This signal is immediately deactivated if write fault (WF) is detected. |
| $\overline{EARLY}$, $\overline{LATE}$ | Early, Late | The outputs to the write precompensation circuitry which indicate delay values for precompensation. These outputs are valid when write gate (WG) is active. They both have open drain outputs. |
| "WD | Write Data | The MFM "write data" is transmitted to the disk drive. Write data is shifted out at the rate determined by the write clock. Write data is output one half bit time before "Early" and "Late"; Write data should be synchronized by a D flip flop clocked at 10 MHz. WD has an open drain output. |
| $V_{SS}$ | | Ground |

The above described sequence of pins for the DMC chip is chosen to provide maximum utility in placing the DMC chip on a circuit board.

Referring now to FIG. 4, there is shown a block diagram illustrating the DMC chip 10 connected in a typical computer system. As can be seen from FIG. 4, the DMC chip is coupled to a CPU bus 70 by the pins (and associated signal lines) BDRQ, INTR, $\overline{CS}$, the address lines $A_2$-$A_0$, $\overline{BCS}$, the data lines $D_0$-$D_7$, $\overline{RE}$, $\overline{WE}$. The DMC chip 10 is also coupled to the buffer memory 20 by the pins $\overline{BCS}$, $D_0$-$D_7$, $\overline{RE}$, $\overline{WE}$, listed above, and in addition by pins BRDY and BCR.

In the illustrated system, the host processor or CPU (not shown) coupled to the CPU bus 70 starts a disk operation by writing the task information into the task registers 16 in the DMC chip 10. As previously mentioned, this task information includes where appropriate the disk cylinder, head and sector numbers, the drive number, track number for start of write precompensation, sector size and the number of sectors to be transferred. After the appropriate task information has been written, the processor writes the command into the command register.

In the case of the write sector command, the host CPU will first write the data to be transferred into the buffer memory 20. When the buffer 20 becomes full, the CPU activates the buffer ready (BRDY) input of the DMC chip. The DMC chip then deactivates the buffer data request (BDRQ) line and activates the buffer chip select ($\overline{BCS}$) line. The buffer chip select ($\overline{BCS}$) line is used both for buffer memory control as well as for controlling the transceivers (not shown) of the data bus 25 as well as the read enable ($\overline{RE}$) and write enable ($\overline{WE}$) signal line tranceivers (not shown). The DMC chip thus has a direct bus to the buffer memory 20 which is isolated from the processor data bus of the CPU bus 70. After all the buffer data is transferred to the disk 18 thereby emptying the buffer memory 20, the DMC chip 10 enables the bus transceivers (not shown) between the host CPU and the buffer memory. The host processor can then write more data into the buffer memory 20.

The DMC chip 10 also generates control signals for RAM counter control and direct memory access (DMA) control as discussed above in the table.

On the disk drive side of the DMC chip 10, the WD output pin on which the write data to the disk drive 18 is provided, is coupled to the input of a "D" flip-flop 80 which is clocked by a 10 megahertz clock signal. The output of the flip-flop 80 is inputted by the write precompensation circuitry 22 which compensates the write data for the decreasing track size as previously discussed. The delay values for the write precompensation circuitry 22 are provided by the DMC chip 10 at the early and late output pins as shown. The write precompensation circuitry 22 is gated by the reduced write current (RWC) signal which also indicates to the drive 18 that a reduced write current is to be used.

To control the movement of the read/write head of the drive 18, the STEP and DIR signal pins of the DMC chip 10 are connected to the drive as shown. The "step" signal causes the read/write head to move either inwardly or outwardly as specified by the direction signal DIR. Also coupled to the drive 18 are the status input and output pins, DRDY, WF, TKOOO, INDEX and WG described in the above table.

The DMC chip 10 is designed to operate with two clock inputs, read clock (RC) and write clock (WC). Those portions of the DMC chip which relate to the interface between the DMC chip and the host CPU use the write clock input. In addition, the sections of the DMC chip which control the buffer memory 20 and the data writing functions also use the write clock input.

Because the rate at which the disk drive 18 transmits data is a function of the rotational speed of the disk, a separate clock is used to read the data from the disk. The external phase lock loop circuitry 38 generates a read clock (RC) signal which is synchronized with the data transmission rate of the disk drive 18. The MFM decoding circuitry of the read data processing circuitry 29 is clocked by the read clock to synchronize the MFM decoding circuitry with the data transmission rate of the disk drive 18.

The read data from the drive 18 is presented to the read data (RD) input of the DMC chip 10. The read gate (RG) signal is low when the controller is not inspecting read data from the drive.

When a read command is executed, a search begins for the sequence of zeros preceeding each address mark. In addition to generating the read clock signal, another function of the phase lock loop circuitry 38 is to inspect the read data from the drive 18 and indicate to the DMC chip 10 on the DRUN signal pin when consecutive zeros have been detected in the read data. When the DRUN input indicates a sequence of zeros in the read data, the read gate (RG) signal is activated and the read data is examined by the DMC chip until either an address mark is detected or a non-zero byte which is not an address mark is detected. If an address mark is detected, read gate (RG) is held high and the ID or data field following the address mark can be read. On the other hand, if a non-zero, non-address mark byte is detected, read gate (RG) is dropped so that the next four bytes are ignored. As a result, the phase lock loop circuitry 38 resynchronizes with the write clock before the DMC chip inspects the DRUN input again. If the desired ID field was read, the sector transfer can be made. If a data field was detected or the ID bytes did not match, the read gate (RG) signal is lowered and the DRUN input is inspected again for a sequence of zeros to examine the next address mark.

Referring back to FIG. 3, the various subcircuits of the microcontroller 12 are indicated in broken line. The microcontroller 12 includes task register address decoding circuitry 12a which is disposed adjacent to the task registers 16 and along a part of the fourth side 62 of the interface circuitry 54. The task register address decoding circuitry 12a decodes the address signals transmitted from either the microcontroller or the host CPU to select a particular task register to enable that register to be read from or written into. Disposed between the task register address decoding circuitry 12a and the ROM 42 is the program counter and stack circuitry 12b. The stack provides temporary storage of instructions read from the ROM and the program counter circuitry points to the next instruction which is to be executed.

The microcontroller 12 also has a condition multiplexor 12c which gates various condition information for inspection by the microcontroller. The condition multiplexer 12c is disposed adjacent to the I/O buffer/latch circuitry 24 and the task registers 16 and along the third side 60 of the interface circuitry 54. Disposed between the condition multiplexor 12c and the write data processing circuitry 26 is an indentification (ID) programmed logic array (PLA) controller 12d of the microcontroller 12. The ID PLA controller 12d receives the bytes assembled by the serial to parallel converter of the read data processing circuitry 29 and inspects the assembled bytes to determine if the correct identification (ID) field has been read from the disk drive. The ID PLA controller 12d is also disposed adjacent to the task registers 16, the task register address decoding circuitry 12a and the program counter and stack circuitry 12b as shown in FIG. 3.

The microcontroller 12 also has ROM address decoding circuitry 12e disposed adjacent to the ROM 42, which decodes the address signals transmitted by the microcontroller 12 to read a particular ROM location. Disposed between the ID PLA controller 12d and the ROM address decode circuitry 12e on the one hand, and the CRC logic 28 and read data processing circuitry 29 on the other hand, is the read bus control circuitry 12f of the microcontroller 12. The read bus control circuitry 12f indicates when a full byte has been received from the disk drive. As previously mentioned, the MFM decoding circuitry of the read data processing circuitry 29 is clocked by the read clock. Since the read clock usually differs from the write clock, the read bus control circuitry 12f sychronizes the operation of MFM decoding circuitry with the remainder of the chip. The read bus control circuitry 12f is also disposed along the second side 58 of the interface circuitry 54 as shown in FIG. 3.

The processor interface and buffer control logic of the microcontroller 12 is indicated generally at 12g. The circuitry 12g controls the interaction of the DMC chip with the host CPU and the buffer memory, as previously described with respect to FIG. 4. As shown in FIG. 3, the processor interface and buffer control logic 12g is disposed between the ROM address decoding circuitry 12e and the read data processing circuitry 29 along the first side 56 of the interface circuitry 54.

The microcontroller 12 also has a multiphase clock generator 12h disposed adjacent to the write data processing circuitry 26 and along the second side 58 of the interface circuitry 54. A retry counter 12i is disposed adjacent to the multiphase clock generator 12h and the ID PLA controller 12d. The retry counter 12i counts the number of times that the DMC chip has tried to find the sector specified by a command. In particular, the retry counter counts the number of index pulses which have occurred since the DMC began looking for the desired sector. An index pulse is transmitted to the DMC from the disk drive with every rotation of the disk. In the illustrated embodiment, the retry counter can count up to 15 index pulses before indicating that too many attempts at finding the desired sector have occurred.

Disposed adjacent to the retry counter 12i and the multiphase clock generator 12h is a step timing counter 12j which is used to time the duration of the period between step pulses and hence control the frequency of the step pulses. In the illustrated embodiment, the step pulses can have a duration between pulses in the range of 7.5 milliseconds to close to 0 milliseconds in 0.5 millisecond increments. The step timing counter counts the number of 0.5 millisecond periods between step pulses.

The microcontroller 12 has a main programmed logic array (PLA) 12k disposed adjacent to the step timing counter 12j and the multiphase clock generator 12h and along the second side 58 of the interface circuitry 54. The main PLA controller 12k interprets the commands written into the command register by the host CPU and generates the necessary control signals to implement the command. The operation of the main PLA controller is clocked by the write clock (WC) and operates in a "hand-shake" mode when communicating with the MFM decoding circuitry which is clocked by the read clock.

Disposed between the read bus control circuitry 12f and the CRC logic 28 is a magnitude comparison and up/down counter circuit 121 which calculates the direction and the number of drive step pulses necessary to move the read/write head from the present cylinder position to the desired position. As previously mentioned, the read/write head is moved inward or outward one cylinder position for each drive step pulse transmitted by the DMC 10 to the disk drive 18 in the direction specified by the signal pin DIR.

Finally, the microcontroller 12 has a read PLA controller 12m disposed between the CRC logic 28 and the read data processing circuitry 29 and adjacent to the read bus control circuitry 12f for the microcontroller 12. The read PLA controller 12m reads the data field from the bytes assembled by the read data processing circuitry 29 for transmission to the buffer memory 20.

Within the quadrilateral framework of the interface circuitry 54 between the first side 56 and the fourth side 62 thereof is disposed a test pattern and voltage converter, as indicated at 90. The test pattern contains a small number of resistors and transistors which are provided for test purposes. The voltage converter generates a voltage of approximately −2.5 volts from the +5 volt supply voltage designated Vcc. A negative voltage on the bottom layer of the integrated circuit can increase operation speed without an increase in power consumption.

Figure 5:
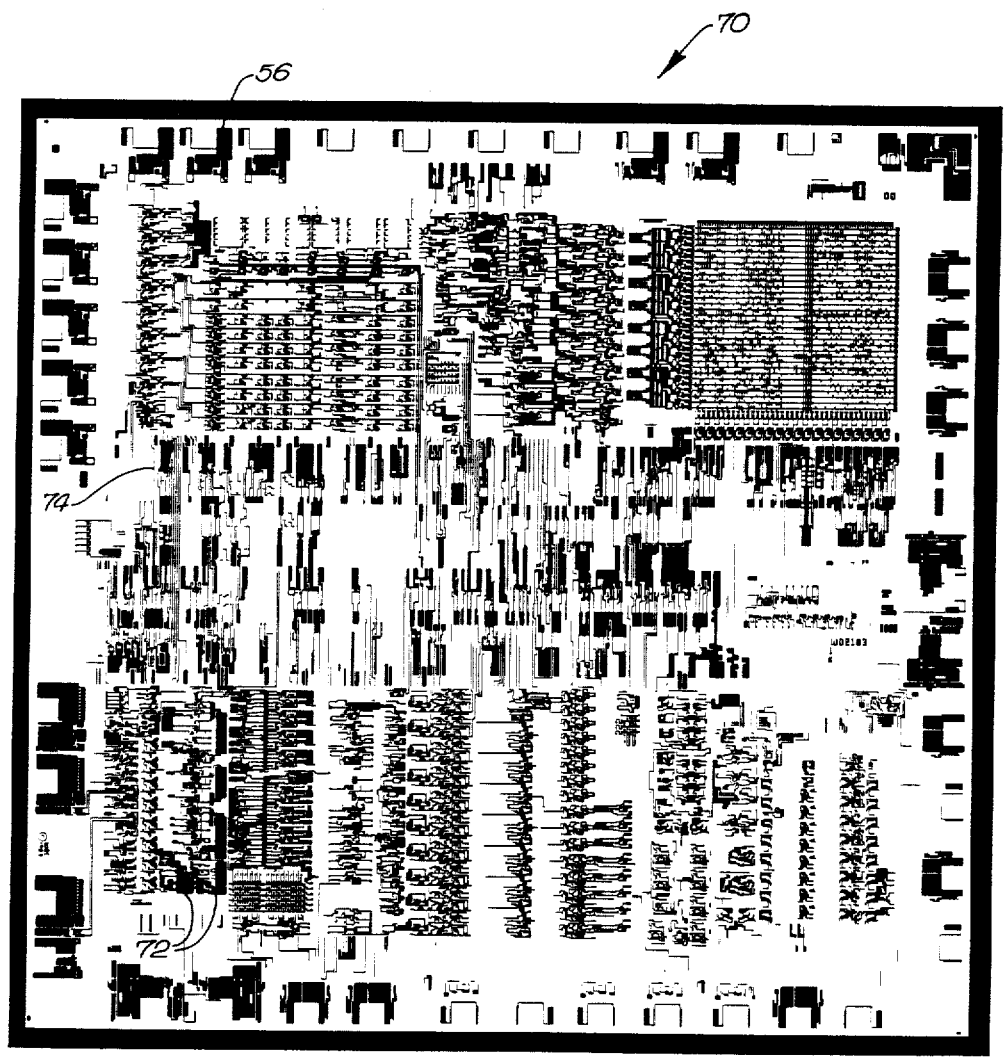
FIG. 5 is a scale drawing of a photomask utilized to pattern the substrate layer in which the source-drain and interconnect diffusion areas are subsequently formed in the manufacture of a MOS DMC circuit according to the invention.

Referring now to FIG. 5, there is shown a drawing of the source-drain definition mask 70 utilized in manufacturing the preferred embodiment of the invention by means of the well known N-channel self-aligned silicon gate MOS manufacturing process. The pattern of dark regions on the chip, such as area 72, designate areas where the source, drain, and channel regions of the MOS field effect transistors (FET's) comprising the DMC chip circuitry are to be subsequently formed. The long, slender lines, such as area 74, designate areas where diffused conductors are to be subsequently formed. Also shown are the source-drain definition patterns 56 for a portion of the circuitry required for the interface control circuitry, and the input and output lines to the DMC chip.

Figure 6:
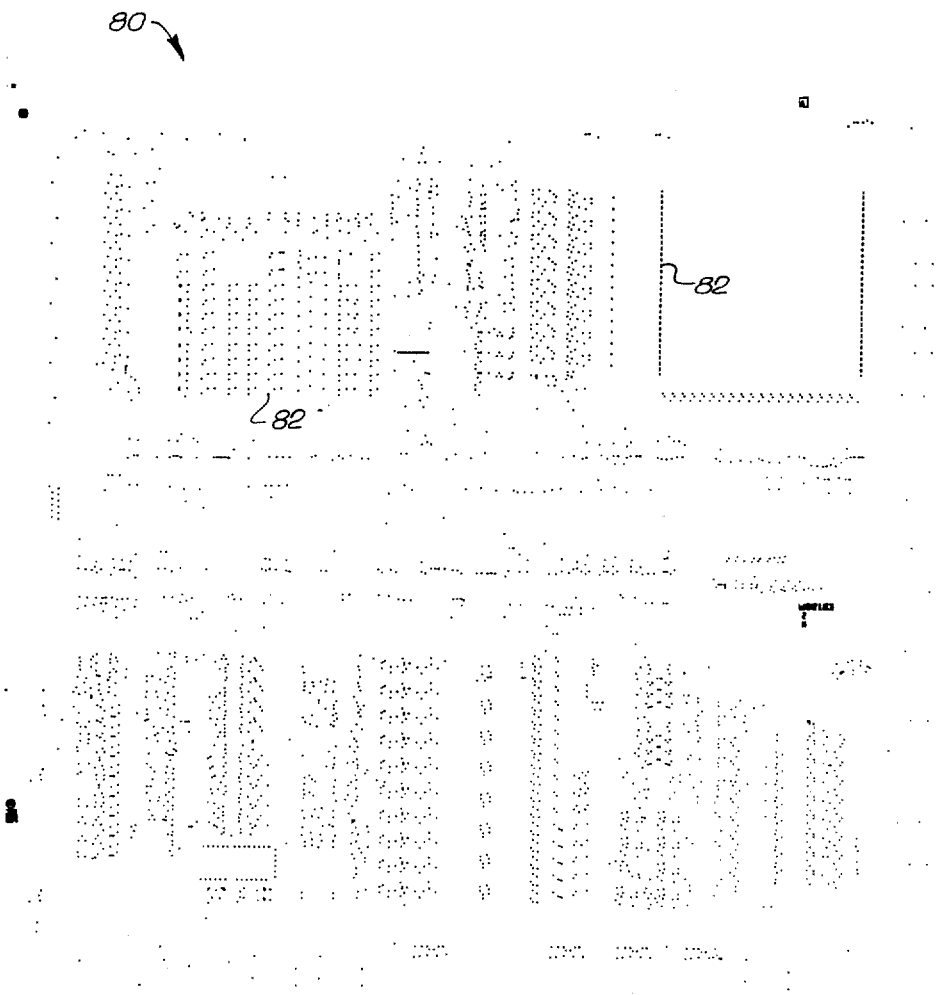
FIG. 6 is a scale drawing of a photomask used to form contacts between a polycrystalline silicon layer and diffusion areas in the manufacture of a MOS DMC chip according to the invention.
Figure 7:
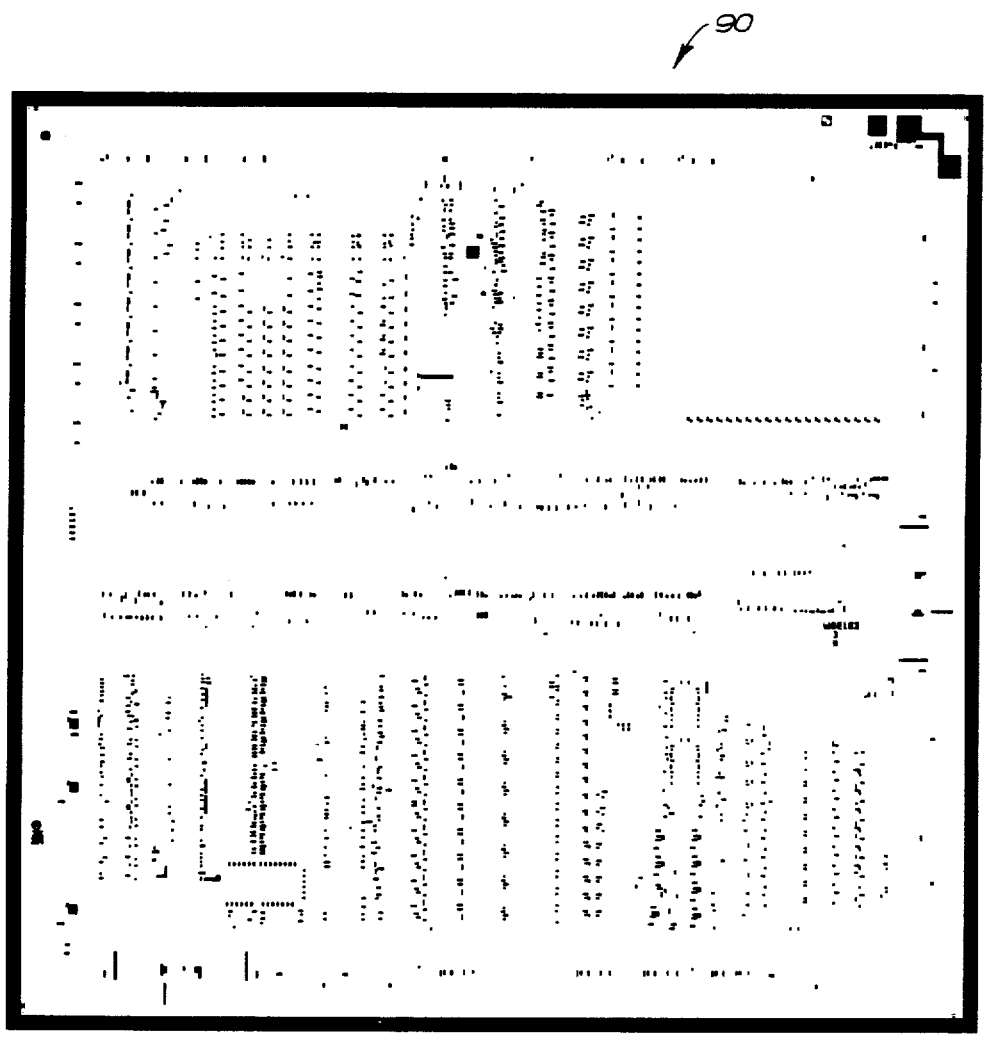
FIG. 7 in a scale drawing of a photomask used to pattern the depletion implants of a MOS DMC circuit according to the invention.
Figure 8:
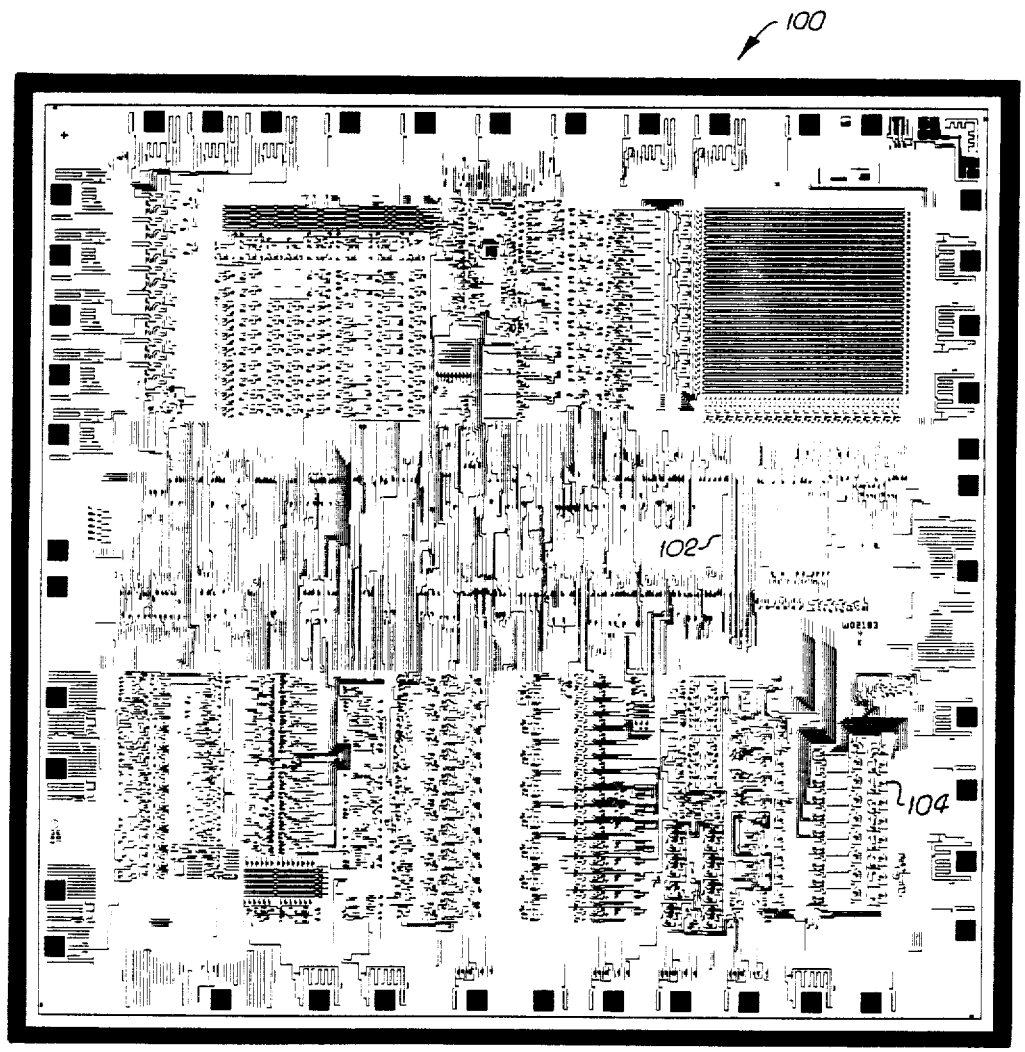
FIG. 8 is a scale drawing of a photomask used to pattern the polycrystalline silicon layer of a MOS DMC circuit according to the invention.

The source-drain definition mask 70 is used to etch patterns in field oxide grown on a P-type silicon substrate which forms the basic structure of the entire DMC chip. After the field oxide is patterned using the source-drain definition mask 70, a thin gate oxide is grown over the entire chip area. This thin gate oxide is then patterned by the diffusion contact mask 80, illustrated in FIG. 6. The dark areas (such as 82) of the diffusion contact mask 60 indicate where polycrystalline silicon-to-diffused region contacts are to be made. After these contact holes are formed in a conventional manner, polycrystalline silicon is deposited over the entire chip structure. FIG. 7 shows the photomask 90 which is used to pattern the depletion implants of the DMC circuitry. The polycrystalline silicon is then patterned using the polymask 100 shown in FIG. 8, which defines the gate electrodes of the FET's that form the active devices comprising the DMC circuitry, and also defines polycrystalline interconnection lines. For example, the long, thin lines 102 are polycrystalline conductors utilized as interconnectors, and do not act as FET gate electrodes. The dark regions, such as 104, represent FET gate electrodes.

Figure 9:
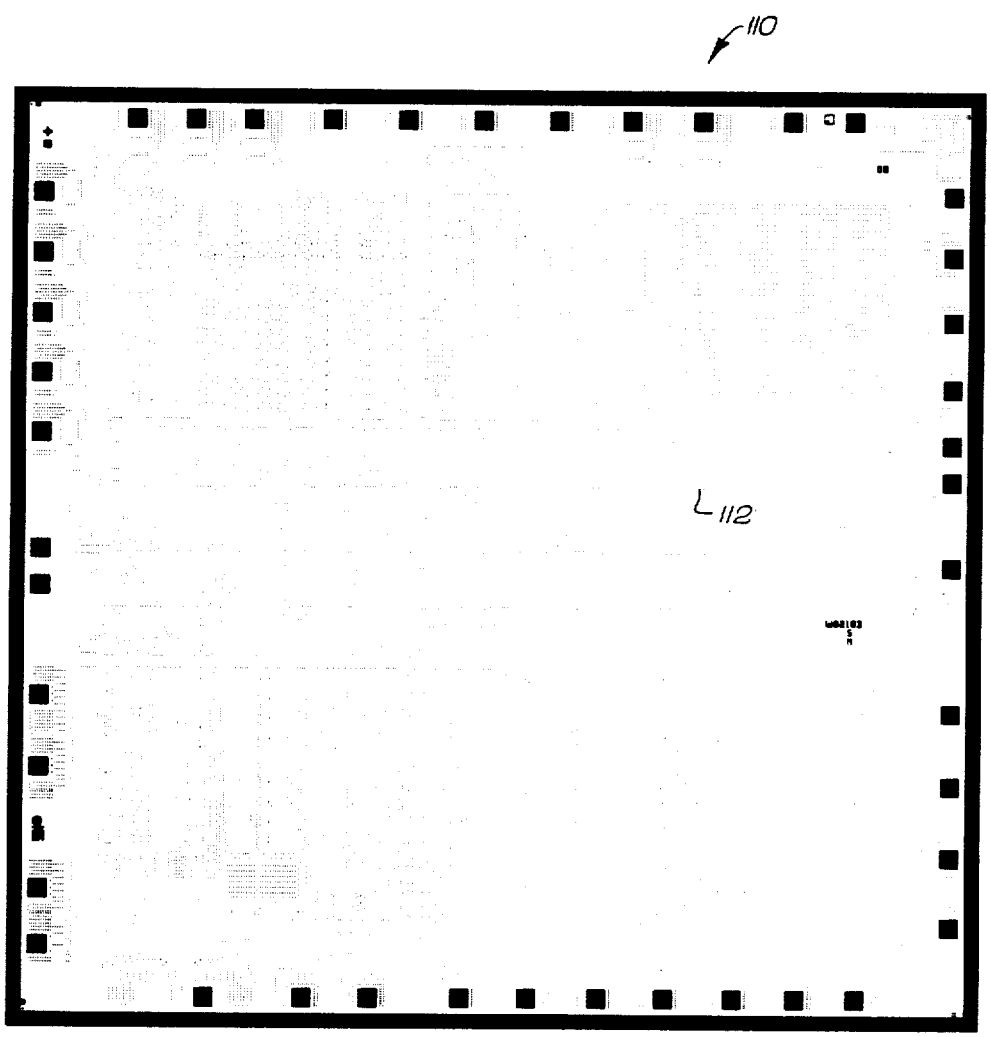
FIG. 9 is a scale drawing of a photomask used to define the pattern of the preohmic contacts that connect a metallized layer to the polysilicon layer and to the source-drain diffusion areas during the manufacture of a MOS DMC circuit according to the invention.

After the DMC chip is patterned with the polymask 100, the entire chip is diffused with N+ material in a conventional manner to complete the formation of the self-aligned silicon gate FET's. Thereafter, silicon oxide is deposited over the entire chip to act as an insulating protective layer. The silicon oxide coating is then etched with the pattern of the preohmic mask 110 shown in FIG. 9. The dark areas, such as 112, define contact points to the polycrystalline silicon conductors and diffusion layer conductors. These contact points will connect to a metal covering that is subsequently applied to the chip.

Figure 10:
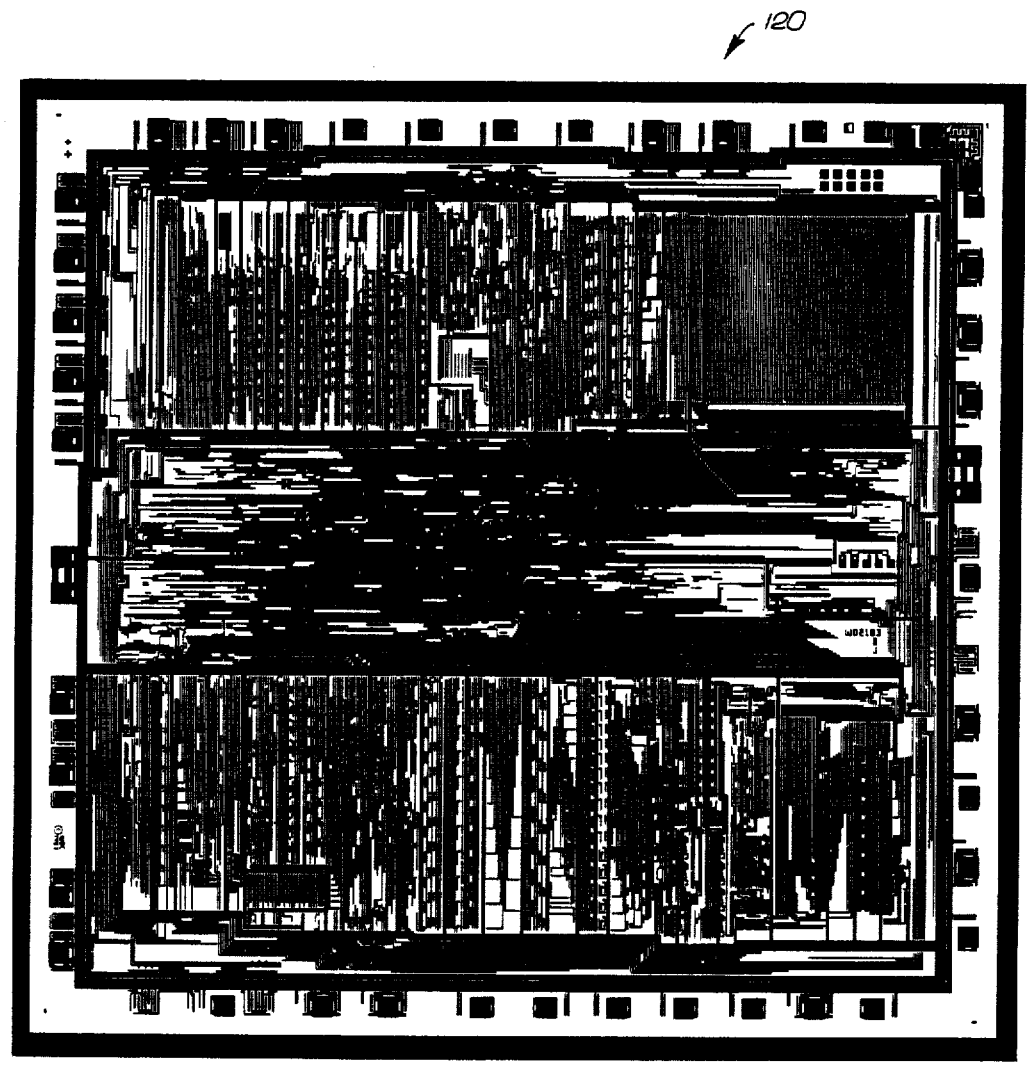
FIG. 10 is a scale drawing of a photomask used to pattern the metal interconnection layer of a MOS DMC circuit according to the invention.

After etching the DMC chip with the preohmic mask 110, the entire chip is coated with a metallic layer, which is then patterned by conventional etching techniques with the metal interconnect mask 120 shown in FIG. 10. The pattern of the metal interconnect mask 120 defines the final level of the device interconnection on the DMC chip.

As a last step, the protection mask 130 disclosed in FIG. 11 is used to define all the areas on the DMC chip that are not to be coated with a protective oxide coating. The bonding pad areas 52 of the chip are masked off by the protection mask 130 so that they will not be covered with the protective coating, thereby ensuring that the bonding properties of the pad areas 52 remain unaffected. Also masked off from the subsequently applied protective coating are several test points 132 used for test probes during the production and testing of the DMC chip.

The information disclosed by FIGS. 5 through 11 illustrates the geometry and interconnections of all of the MOS FET's comprising the DMC circuit described as the preferred embodiment herein. It will be noted in reviewing FIGS. 5 through 11, but in particular FIGS. 5 and 8, that many of the mask patterns forming the MOS FET's and their interconnections are highly symmetric. This symmetry is due primarily to the use of a repetitive cell structure in the design of the LSI chip, which is an important consideration because of the substantial savings in lay-out time achieved by use of such cells. Further, there is a substantially reduced probability of art work error when repetitive cells are used instead of utilizing a custom approach to the art work of each cell. On the other hand, use of standard cells for all of the logic of a MOS LSI chip is very unlikely to optimally utilize the chip area. However, creative use of same repetitive cells in combination with custom art work for other sections of a chip may provide an optimum topology which will make possible a high chip yield from each substrate wafer, provide for good circuit electrical performance, and require a minimal amount of silicon substrate per chip.

A very high level of creativity is required of the chip architect in designing MOS LSI chip circuitry because of the layout constraints for state-of-the-art manufacturing processes. For example, for self-aligned silicon gate MOS manufacturing processes, the major constraints are the minimum width and spacings of the diffused regions, the minimum size required for preohmic openings and the spacings required from the edge of the peripheral preohmic openings to the edge of the diffused regions, the minimum width and spacing of polycrystalline silicon lines and the fact that such lines cannot cross over diffused regions, the minimum width and spacing between metal lines, and the fact that conductors in the same layer or in uninsulated adjacent layers cannot cross over like conductors. The high amount of capacitance associated with diffused regions and the resistance of both diffused lines and polycrystalline silicon lines (and to a lesser extent of metal lines) provide further constraints on the chip architect. For logic circuits which may be characterized as random logic designs, such as that of the subject invention, a large number of interconnection lines between sections of logic circuitry are required, and the very large number of possibilities for routing the various kinds of conductors to the various required sections of the chip takes the ingenuity of the most competent chip topology designer and the capacity of the most sophisticated computer routing programming available. Computer aided design (CAD) programs have been applied to computerize random logic MOS LSI layouts for a number of years. However, CAD programs have been successful only to the extent that they provide rapid prototype circuit designs having rather mediocre performance and producing uneconomically large semiconductor chips. It is well established that the CAD programs currently available do not come close to matching human ingenuity in providing MOS LSI chip architectures for minimized logic designs which provide optimum performance while utilizing minimal substrate area. The exercise of a high level of creativity in the design of MOS LSI chips thus results in economic reward of substantial measure.

While the invention has been described with reference to a preferred embodiment thereof, those skilled in the art will recognize that changes in form and placement of parts may be made to suit various requirements within the scope of the invention.

We claim:

1. A metal oxide semiconductor (MOS) chip for a disk memory controller circuit (DMC) for use in conjunction with external circuitry including an external processor and a buffer memory, said DMC for transferring data between an external disk memory having a disk, and the processor or the buffer memory, said DMC comprising:

(a) chip interface circuitry adapted to couple the DMC to signal lines of external circuitry;
 (b) input/output (I/O) buffer/latch circuitry coupled to the chip interface circuitry for buffering and latching data transmitted between the DMC and the processor or buffer memory;
 (c) a microcontroller for regulating the functions of the DMC;
 (d) task registers coupled to the microcontroller and the buffer/latch circuitry for storing control information received from the processor;
 (e) a read-only-memory (ROM) coupled to the microcontroller, for storing program instructions used by the microcontroller;
 (f) write data processing circuitry coupled to the I/O buffer/latch circuits, the microcontroller and the chip interface circuit, for converting parallel data received from the processor or the buffer memory to serial data, adding address marks to the data, encoding the data and transmitting the encoded data to the disk memory;
 (g) read data processing circuitry coupled to the I/O buffer/latch circuitry, the microcontroller and the chip interface circuitry for detecting address marks in the serial data received from the disk memory, decoding the serial data and converting the serial data to parallel data; and
 (h) error checking circuitry coupled to the I/O buffer/latch circuitry, the write data processing circuitry and the read data processing circuitry for detecting transmission errors in the data read from the disk memory;

wherein the chip interface circuitry forms a quadrilateral outer framework on the chip; the ROM is disposed within one corner of the interface circuitry; the microcontroller is disposed adjacent to the ROM and along part of a first side of the interface circuitry; the read data processing circuitry is disposed adjacent to the microcontroller and within a second corner of the interface circuitry and along part of a second side thereof; the error checking circuitry is disposed adjacent to the read data processing circuitry and along part of the second side of the interface circuitry; the microcontroller is also disposed adjacent to the error checking circuitry and along part of the second side of the interface circuitry; the write data processing circuitry is disposed adjacent to the microcontroller along the second side of the interface circuitry, and is disposed within a third corner of the interface circuit and along a part of a third side of the interface circuitry; the microcontroller is also disposed adjacent to the write data processing circuitry along the third side of the interface circuitry; the I/O buffer/latch circuitry is disposed adjacent to the microcontroller along the third side of the interface circuitry, and is disposed within a fourth corner and along a part of a fourth side of the interface circuitry; the microcontroller is also disposed adjacent to and between the I/O buffer latch circuitry and the ROM along the fourth side of the interface circuitry; and the task registers are disposed between the microcontroller and the I/O buffer/latch circuitry.

2. The MOS DMC chip as recited in claim 1 wherein the circuitry of said chip is n-channel self-aligned silicon gate circuitry.

3. The MOS DMC chip of claim 1 wherein the microcontroller includes task register address decoding circuitry coupled to the chip interface circuitry and the task registers for decoding address signals from the microcontroller or the external processor to select a particular task register, said task register address decoding circuitry being disposed adjacent to the task registers and along part of the fourth side of the interface circuitry.

4. The MOS DMC chip of claim 1 wherein the microcontroller further comprises program counter and stack circuitry coupled to the ROM for indicating the next program instruction to be executed by the microcontroller and for temporarily storing a sequence of instructions to be executed, said program counter and stack circuitry being disposed adjacent to the ROM and along a part of the fourth side of the interface circuitry.

5. The MOS DMC chip of claim 1 wherein the microcontroller further comprises ROM address decode circuitry for decoding address signals from the micro controller to select a particular program instruction in the ROM, said ROM address decode circuitry being disposed adjacent to the ROM and along a part of the first side of the interface circuitry.

6. The MOS DMC chip of claim 1 wherein the microcontroller further comprises processor interface and buffer control logic coupled to the interface circuitry for generating and receiving external processor and buffer memory control signals to control operations of the external processor and the buffer memory and to respond to signals from the external processor, said processor interface and buffer control logic being disposed adjacent to the read data processing circuitry and along a part of the first side of the interface circuitry.

7. The MOS DMC chip of claim 1 wherein the microcontroller includes a first programmed logic array coupled to the read data processing circuitry for reading the data field from the parellel data assembled by the read data processing circuitry for transmission to the I/O buffer latch circuitry, said first programmed logic array being disposed between the read data processing circuitry and the error checking circuitry.

8. The MOS DMC chip of claim 1 wherein the microcontroller includes a multiphase clock generator for generating a plurality of clock pulses of differing phases, said multiphase clock generator being disposed adjacent to the write data processing circuitry and along a part of the second side of the interface circuitry.

9. The MOS DMC chip of claim 8 wherein the microcontroller further includes a programmed logic array for controlling the functions of the microcontroller, said programmed logic array being disposed adjacent to multiphase clock generator and along a part of the second side of the interface circuitry.

10. The MOS DMC chip of claim 9 wherein the disk memory has a head for reading and writing data and the DMC chip has means for generating step pulses at a programmable rate to move the disk memory head, the microcontroller further comprising a step timing counter for counting the time periods of a particular duration between step pulses, said step timing circuitry being disposed adjacent to the multiphase clock generator and the programmed logic array of the microcontroller.

11. The MOS DMC chip of claim 10 wherein the DMC further has means for locating a particular data block stored on the disk memory, the microcontroller further including a retry counter for counting the number of times that the disk has rotated while the DMC is attempting to find the desired data block, said retry counter being disposed adjacent to the multiphase clock generator and the step timing counter.

12. The MOS DMC chip of claim 11 wherein the write data processing circuitry is clocked at a first frequency and the read data processing circuitry is clocked at a second frequency which is dependent upon the rotational speed of the disk, said read data processing circuitry further including a read bus and the microcontroller further comprising read bus control circuitry for indicating to the programmed logic array that a full byte of data has been read from the disk memory, said read bus control circuitry being disposed adjacent to the error checking circuitry and the read data processing circuitry and also along a part of the second side of the interface circuitry.

13. The MOS DMC chip of claim 12 wherein the mircocontroller further comprises a magnitude comparator circuit for calculating the number of step pulses and the drive step direction between the present head position and the desired position of the head, wherein the magnitude comparator circuit is disposed adjacent to and between the read bus control circuitry and the error checking circuitry and is further disposed along a part of the second side of the interface circuitry.

14. The MOS DMC chip of claim 13 wherein the DMC chip has means for storing an identification (ID) field with a group of data to identify the data, the microcontroller further comprising an ID programmed logic array (PLA) for determining whether the group of data read from the disk memory has the desired ID field, wherein said ID PLA is disposed along a part of the third side of the interface circuitry and adjacent to the write data processing circuitry, the multiphase clock generator, the retry counter and the read bus control circuitry.

15. The MOS DMC chip of claim 14 wherein the microcontroller further comprises a condition multiplexor circuit for gating various condition information for inspection by the microcontroller, said condition multiplexor circuit being disposed along a part of the third side of the interface circuitry and is disposed between and adjacent to the ID PLA and the I/O buffer/latch circuitry.

16. The MOS DMC device of claim 1 wherein the DMC chip is coupled to a positive voltage supply, said DMC chip further comprising a voltage generator for generating a negative voltage from the positive voltage, said voltage generator being disposed in a quarter of the quadrilateral outer framework adjacent to the ROM.

* * * * *